United States Patent [19]
Fujino

[11] Patent Number: 5,574,727
[45] Date of Patent: Nov. 12, 1996

[54] CORDLESS TELEPHONE SYSTEM AND COMMUNICATION METHOD THEREOF

[75] Inventor: Masayasu Fujino, Funabashi, Japan

[73] Assignee: Uniden Corporation, Chiba, Japan

[21] Appl. No.: 357,278

[22] Filed: Dec. 13, 1994

[30] Foreign Application Priority Data

Dec. 14, 1993 [JP] Japan .................................. 5-342608

[51] Int. Cl.⁶ ...................................................... H04L 3/06
[52] U.S. Cl. ..................... 370/95.1; 370/100.1; 375/357; 379/63; 455/54.2
[58] Field of Search ........................ 379/58, 63; 375/357; 455/51.1, 54.2, 58.2, 33.1; 370/29, 100.1, 105.2, 58.1, 77, 110.1, 95.1, 95.3

[56] References Cited

U.S. PATENT DOCUMENTS

| | | | |
|---|---|---|---|
| 5,210,785 | 5/1993 | Sato et al. ................................ | 379/63 |
| 5,280,541 | 1/1994 | Marko et al. ........................... | 455/54.1 |
| 5,363,430 | 11/1994 | Yamagata et al. ....................... | 379/61 |
| 5,384,828 | 1/1995 | Brown et al. ............................ | 379/61 |

Primary Examiner—Douglas W. Olms
Assistant Examiner—Seema Rao
Attorney, Agent, or Firm—Lowe, Price, LeBlanc & Becker

[57] ABSTRACT

The cordless telephone system according to the present invention comprises a synchronization inhibiting circuitry for inhibiting, when a calling station sends a communication end request code, synchronization with a called station in communication therewith for a prespecified inhibit time after transmission of the communication end request code, and a communication terminating circuitry for terminating communication if a state where synchronism with the called station is lost continues for a prespecified reference time during communication. Thus, communication is terminated without fail when a call ends, and transactions of unnecessary electric waves are reduced.

22 Claims, 8 Drawing Sheets

CORDLESS TELEPHONE SYSTEM AND COMMUNICATION METHOD THEREOF

FIELD OF THE INVENTION

The present invention relates to a cordless telephone system and a communication method thereof which executes communication between a master phone and a slave phone based on a time division system, and more particularly to a cordless system and communication method thereof which can terminate communication without fail.

BACKGROUND OF THE INVENTION

In a conventional type of cordless telephone system based on a time division system, synchronism of communication frame is established by means of transaction of synchronizing request code (SYNC code). When terminating a call while synchronism is established, a station hoping to terminate a call sends communication end request code (END code) specified times (for instance, three times) to a called station and terminates communication of the station. On the other hand, the called station receiving the END code recognizes end of communication and terminates communication of the station.

In the conventional type of cordless telephone system, however, a station hoping to terminate communication sends the END code and then terminates communication without checking whether the called station has received the END code. For this reason in a case where the END code has not been received by the called station due to, for instance, interference among radio zones, the called station determines that the radio link had been disconnected for some reason or other, and sends a SYNC code to establish synchronism again, so that synchronism between the station and the called station is again established and communication is enabled. In other words, even if a user wants to terminate a call, a communication call is not disconnected immediately, and transmission continues despite that the station is not used. Such disadvantages to a user as accounting of telephone fee or waste of electric power occur.

Figure 8:
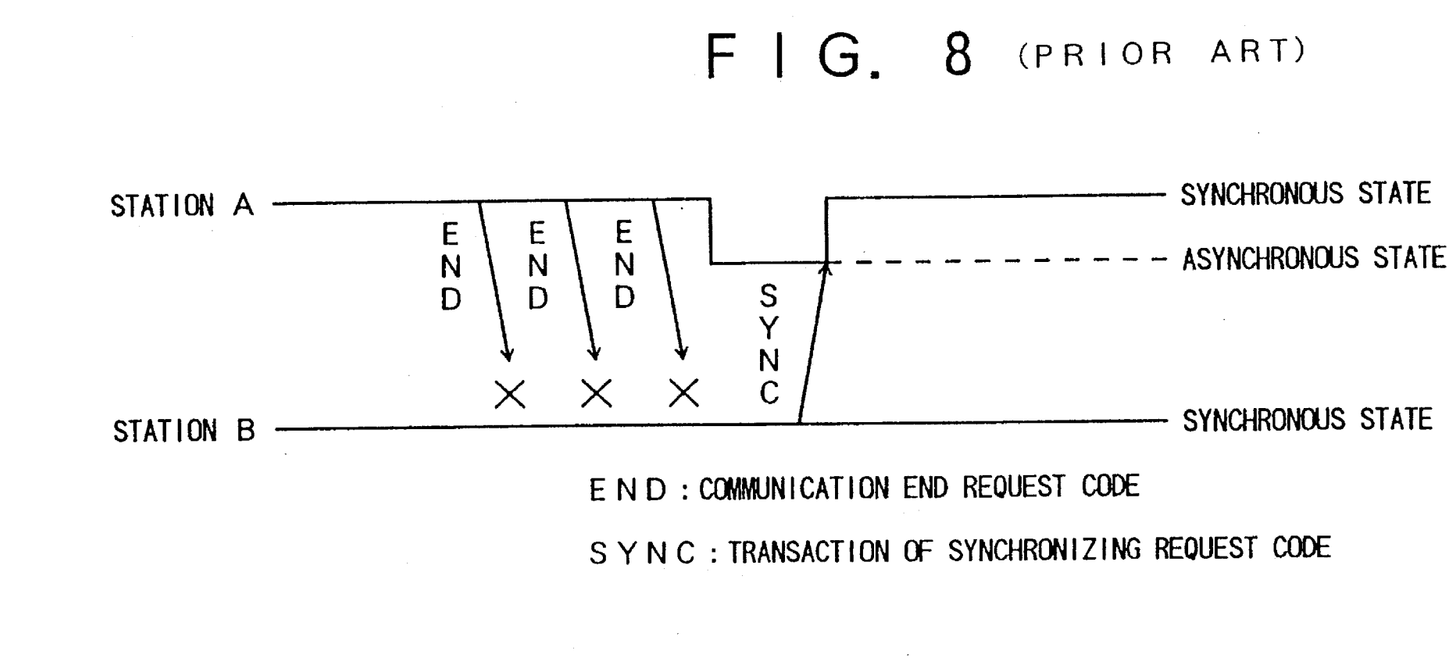
FIG. 8 is a drawing for explaining problems in a conventional type of cordless telephone system.

As shown in FIG. 8, assume that a calling station A sends the END code 3 times and then enters an asynchronous state (terminates communication), but a called station B does not receive END code, so that the called station B determines that the radio link has been disconnected for some reason or other and continues to send SYNC code until synchronism is established again. The calling station A, receiving this SYNC code, again establishes synchronism and enables communication as in a case where a new request for event is issued.

On the other hand, in the conventional type of cordless telephone system, it is possible to evade the case where a called station can not detect end of communication and synchronism is again established to enable communication. This occurs by employing a system in which a calling station sends the END code and terminates communication only when the calling station confirms that the called station has received the END code, but the telephone line is not disconnected in spite that the user hopes to terminate the call. A state where transmission continues, even though the calling station is not in use, continues for a long time. This creates disadvantages to users such as accounting of telephone fee or waste of electric power.

SUMMARY OF THE INVENTION

It is an object of the invention to terminate communication without fail when a call ends and also to reduce transmission of unnecessary electric waves after the end of a call.

In the cordless telephone system and communication method thereof according to the present invention, when a calling station sends a communication end request code to terminate communication, reestablishment of synchronism can be evaded, even if a called station has not received the communication end request code, by inhibiting establishment of synchronism with the called station for a prespecified period of inhibition after the communication end request code is sent. Also, when synchronism with a called station is lost for a prespecified reference period of time during communication, by terminating communication, a calling station recognizes an end of call and terminates communication even if the communication end request code sent from the calling station is not received.

In the cordless telephone system and communication method thereof according to the present invention, two types of synchronization request code, namely, a first synchronization request code used for notification of a new event in a stand-by state where communication is not being executed and a second synchronization request code used when synchronism is lost due to an error during communication and re-establishment of communication is required, are selectively sent. Receiving of the second synchronization request code is inhibited for a prespecified inhibition period after the communication end request code is sent, or communication is terminated if a state where synchronism with a called station is lost continues for a prespecified reference period during communication. Hence, a communicating state can be suppressed even if the communication end request code has not been received by a called station, or when communication end request code sent from the called station can not be received.

In the cordless telephone system and communication method thereof, after the communication end request code is sent, if a synchronization request code from a called station is received within a prespecified inhibition period, a calling station terminates communication by sending the communication end request code again even if the called station fails in receiving the first communication end request code.

Other objects and features of this invention will become understood from the following description with reference to the accompanying drawings.

DESCRIPTION OF THE PREFERRED EMBODIMENTS

Detailed description is made for the cordless telephone system according to the present invention in the order of Embodiment 1, Embodiment 2, Embodiment 3, Embodiment 4 and Embodiment 5 with reference to the related drawings.

Figure 1:
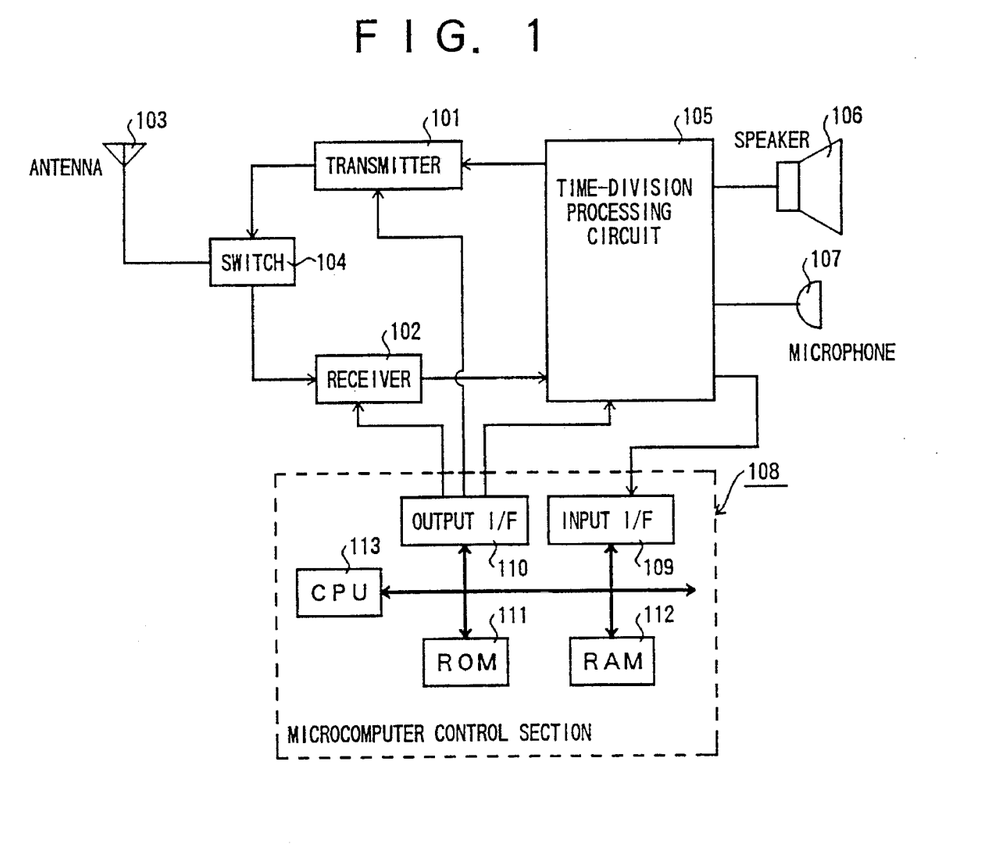
FIG. 1 is a block diagram of a cordless telephone system according to Embodiment 1 of the present invention.

FIG. 1 is a block diagram of a cordless telephone system according to Embodiment 1 of the present invention, and in this figure, designated at the reference numeral 101 is a transmitter, at 102 a receiver, at 103 an antenna, at 104 a switch for switching connection between the transmitter 101, receiver 102, and antenna 103, at 105 a time-division processing circuit for executing communication control according to a time division system, at 106 a speaker, at 107 a microphone, and 108 a microcomputer control section for providing ON/OFF controls over each of the above sections to execute synchronization inhibit control and communication end control.

It should be noted that the microcomputer control section 108 comprises an input I/F (interface) 109 for inputting a signal from the time-division processing circuit 105, an output I/F 110 for outputting an ON/OFF signal to the transmitter 101, receiver 102 and time-division processing circuit 105, a ROM 111 for storing a control program therein, a RAM 112 which is a memory for work, and a CPU 113 executing a control program stored in the ROM 111 to execute synchronization inhibit control and communication end control, such as a CORDLESS TELEPHONE MODEL: EXP9100 and its Service Information Manual, made by Uniden Corporation and Sold by Uniden America Corporation, of which disclosure is incorporated herein by the reference.

With the configuration as described above, next description is made for (1) operational principles in Embodiment 1, and (2) control operations by the microcomputer control section. (1) Operational principles in Embodiment 1

The cordless telephone system according to Embodiment 1 automatically stops trying to establish synchronism and disconnects a radio line to terminate communication when synchronism with a called station is lost for a specified period of time during communication (in a state where synchronism has been established). To realize the operations as described above, the cordless telephone system according to Embodiment 1 executes synchronization inhibit control and communication end control as described below in the microcomputer control section 108.

Herein, the synchronization inhibit control is defined as inhibition of synchronization with a called station for a prespecified period of inhibition time T2 (Refer to FIG. 2) after transmission of an END code when a calling station sends the END code to terminate communication, and in Embodiment 1, synchronization with a called station is inhibited by providing ON/OFF control over the transmitter 101, receiver 102, and time-division processing circuit 105 to inhibit input/output of a signal.

Figure 2:
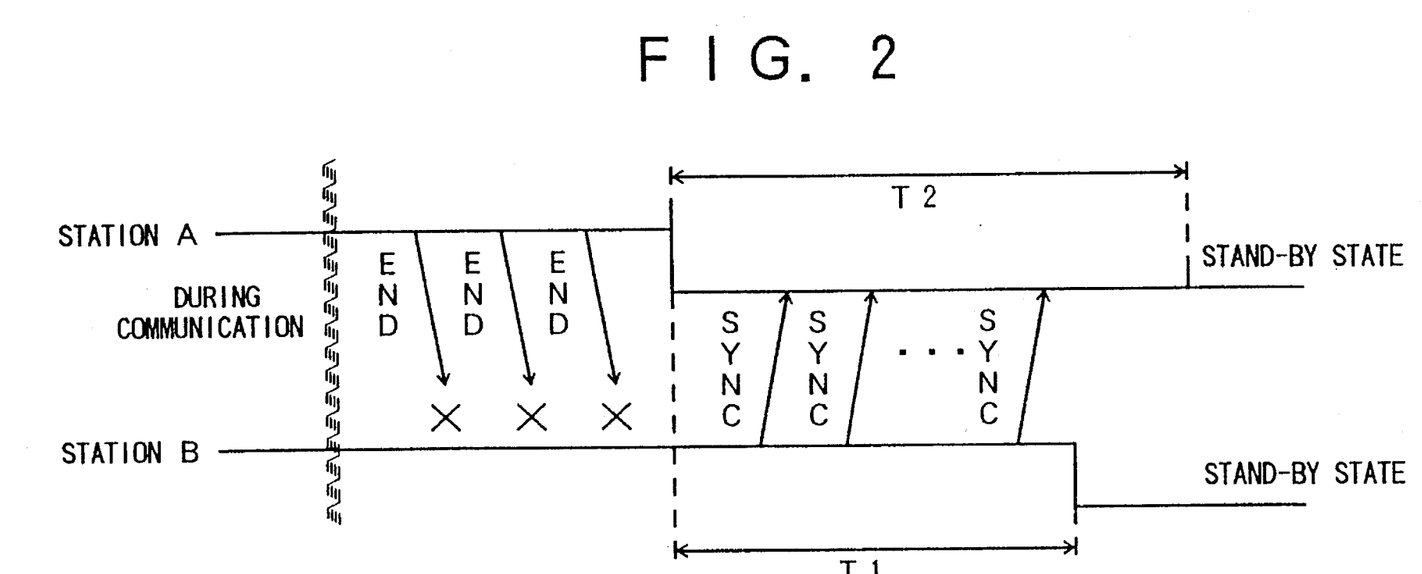
FIG. 2 is a drawing for explaining a relation between an inhibition time T2 in synchronization inhibition control and a reference time T1 in communication end control.

Also herein the communication end control is defined as a control for termination of communication when a state where synchronism with a called station is lost during communication for a prespecified period of reference time T1 (Refer to FIG. 2).

Next, description is made for a relation between the inhibit time T2 in synchronization inhibit control and the reference time T1 in communication end control with reference to FIG. 2. It should be noted that FIG. 2 shows a case where Station A executes the synchronization inhibit control and Station B executes the communication end control.

At first, Station A executes transmission of END code specified times (herein three times), then terminates communication, and also actuates a T2 timer (not shown) to start measurement of the inhibit time T2.

On the other hand, if the END code sent from Station A is not received by Station B due to such reasons as interference among radio zones, Station B enters the state where a radio link has been disconnected (asynchronous state) without being notified of the desire to release the radio link (without receiving END code), so that Station B sends the SYNC code to establish synchronism again and actuates the T1 timer (not shown) to start measurement of the reference time T1.

However, as shown in FIG. 2, as the relation of inhibit time T2 > reference time T1 has been set up, even if Station B tries to establish synchronism with Station A during the reference time T1, synchronism between Station A and Station B is not established because synchronization to Station B is inhibited for the inhibit time T2 due to the synchronization inhibit control in Station A. For this reason, Station B automatically terminates communication by means of the communication end control at a time when the reference time T1 has passed.

It should be noted that, when the inhibit time T2 has passed, Station A cancels inhibition of synchronization with Station B, synchronization between Station B and Station A is enabled on the condition that the inhibit time T2 has passed.

It should be noted that the inhibit time T2 is a period when communication is disabled if the communication circuit is intentionally turned OFF when communication is terminated. The time must be short enough for a user using the cordless telephone system not to get embarrassed. It is possible to set the inhibit time T2 within a range from 1 to 2 seconds.

The reference time T1 depends on a width of interference which may occur among radio zones. In case of a radio link disconnection due to slight interference, it is required that radio communication can be continued by re-linking, and the reference time T1 must be a period in which it can be determined that the radio line was intentionally disconnected (communication was intentionally terminated) by the called station. Also, in the cordless telephone system according to Embodiment 1, when a radio link is disconnected due to light interference among radio zones, the minimum time required for re-linking (synchronizing) to a called station is 9 ms.

Taking the requirements as described above into consideration, in Embodiment 1, the reference time T1 is set to 500 ms, while the inhibit time T2 after transmission of END code is set, taking into such factors as delay between radio zones, to a time longer than the reference time T1 satisfying the following relation:

Reference time T1 < inhibit time T2 (= 600 ms) so that the called station can recognize disconnection of a radio communication line.

When set up as described above, even if an event of sending or receiving a call occurs after communication is terminated, radio connection can be established again without being noticed by a user. (2) Controlling operations by microcomputer control section During communication with a cordless telephone system, the CPU 113 in the microcomputer control section 108 inputs information such as reception of END code from the time-division processing circuit 105, asynchronous state, transmission of END code or others, and executes synchronization inhibit control and communication end control.

Figure 3:
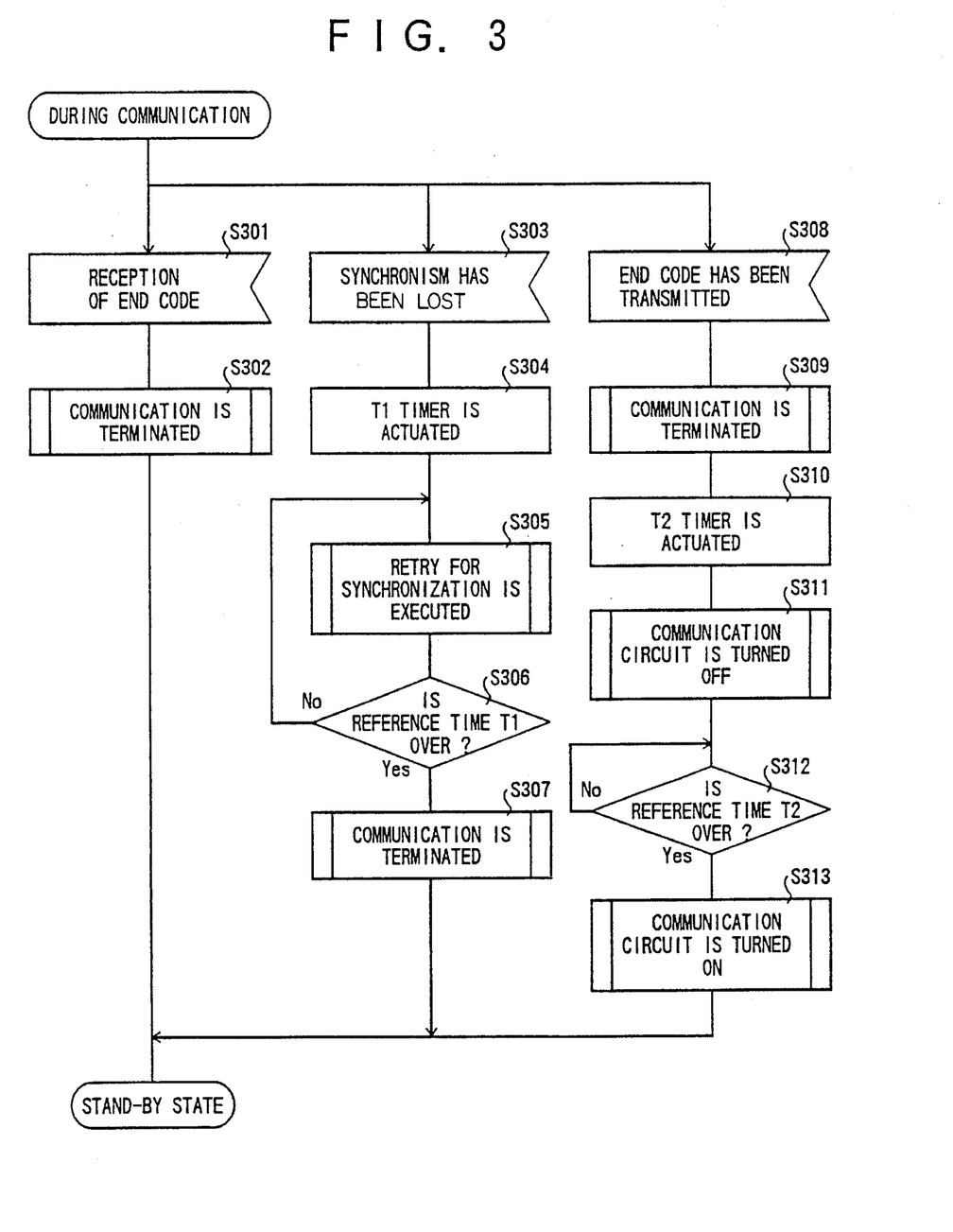
FIG. 3 is a flow chart of controlling operations of a microcomputer control section in Embodiment 1.

FIG. 3 is a flow chart of controlling operations of the microcomputer control section 108 in Embodiment 1. At first, information on reception of END code is inputted from the time-division processing circuit 105 (S301), and then communication is terminated (S302).

When information that synchronism has been lost is inputted from the time-division processing circuit 105 (S303), communication end control is started, the T1 timer is actuated (S304), SYNC code is sent to a called station, and retry for synchronization again is executed (S305). This retry for synchronization is repeated until the reference time T1 is over (S306), and when the reference time T1 is over, communication is terminated (S307).

On the other hand, when information that END code has been transmitted is inputted from the time-division processing circuit 105 (S308), synchronization inhibit control is started, communication in a calling station is terminated, the T2 timer is started (S309, S310), an OFF signal is outputted to the transmitter 101, receiver 102, and time-division processing circuit 105, the communication circuit is turned OFF, and synchronization is inhibited (S311). Then, when the inhibit time T2 is over (S312), an ON signal is outputted to the transmitter 101, receiver 102, and time-division processing circuit 105, the communication circuit is turned ON, and synchronization is enabled (S313).

As described above, in Embodiment 1, synchronization with a called station is inhibited for the inhibit time T2 after transmission of the END code, and if synchronism is lost and synchronization is not again established within the reference time T1, communication is automatically terminated. Hence, communication is terminated without fail when a call ends and unnecessary transmission of power after the end of transmission can be reduced.

The configuration in Embodiment 2 is similar to that in Embodiment 1, and synchronization with a called station is inhibited by disabling use of a frequency used in transmission of END code for the inhibit time T2 in synchronization inhibit control by the microcomputer control section 108. It should be noted that other portions of the configuration and operations thereof are the same as those in Embodiment 1 and description is made for only different portions herein.

Figure 4:
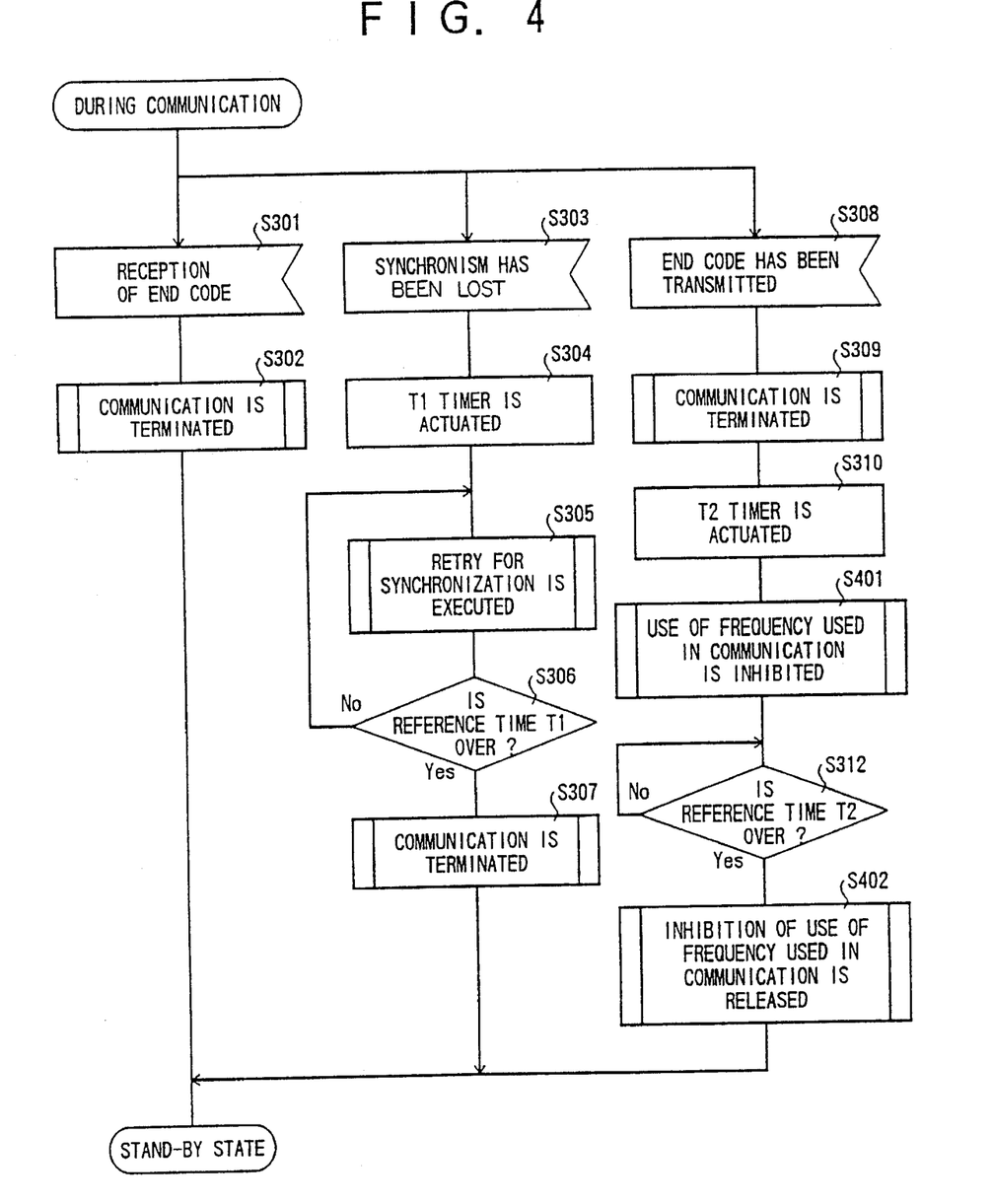
FIG. 4 is a flow chart of controlling operations of the microcomputer control section in Embodiment 2.

FIG. 4 is a flow chart of controlling operations by the microcomputer control section 108 in Embodiment 2, and the reference numerals common to those in the flow chart of controlling operations in Embodiment 1 shown in FIG. 3 indicate the same processing respectively. In this figure, when information that the END code has been transmitted is inputted from the time-division processing circuit 105 (S308), synchronization inhibit control is started to terminate communication in a calling station, the T2 timer is actuated (S309, S310), and an instruction for inhibition of use of a frequency used in transmission of END code is issued to the transmitter 101, receiver 102, and time-division processing circuit 105; in other words, use of only a frequency used in communication with a called station is inhibited to suppress synchronization with only a called station in communication using the frequency (S401). Then, when the inhibit time T2 is over (S312), instruction for releasing inhibition of use of the frequency is issued to the transmitter 101, receiver 102 and time-division processing circuit 105 to enable synchronization (S402).

As described above, in Embodiment 2, in addition to the effects achieved in Embodiment 1, use of only the frequency used in communication up to the current point of time is inhibited, and synchronization of only the called station in communication up to the point of time is disabled, and even if an event from another station occurs with a different frequency within the inhibit time T2, the station can be used without any trouble.

The configuration in Embodiment 3 is similar to that in Embodiment 1, and synchronization with a called station in communication therewith is inhibited by not accepting a SYNC code from a called station which sent the END code for the inhibit time T2 in synchronization inhibit control by the microcomputer control section 108. Other portions of Embodiment 1 are the same as those in Embodiment 1, so that description is made for only different points.

Figure 5:
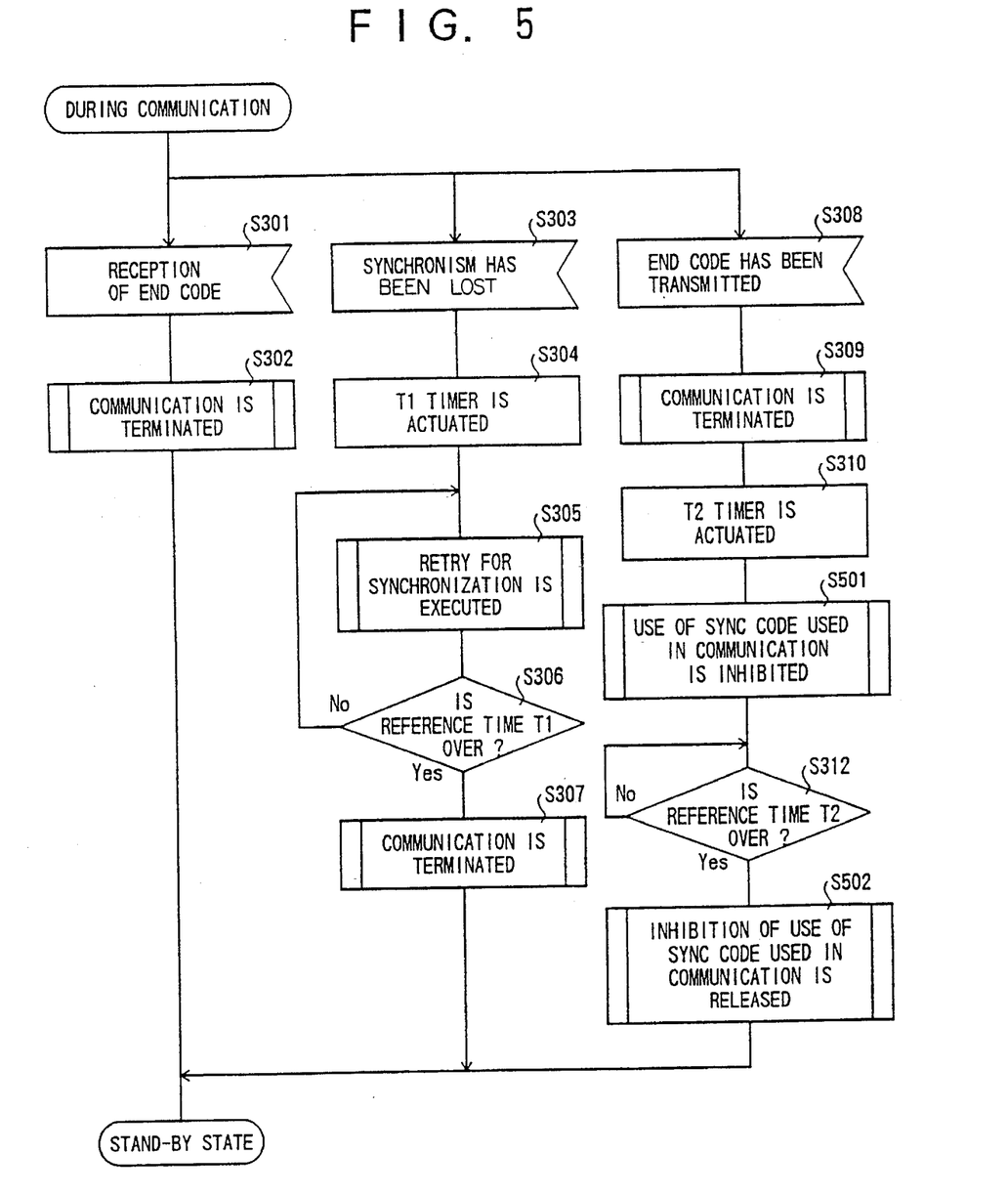
FIG. 5 is a flow chart of controlling operations of the microcomputer control section in Embodiment 3.

FIG. 5 is a flow chart of controlling operations by the microcomputer control section 108 in Embodiment 3, and the reference numerals common to those in Embodiment 1 shown in FIG.3 indicate the same process respectively. In this figure, when information indicating that END code has been sent is inputted from the time-division processing circuit 105 (S308), synchronization inhibit control is started with communication in a calling station terminated, the T2 timer is started (S309, S310), and an instruction for rejection of SYNC code from a called station which sent END code is issued to the time-division processing circuit 105. In other words, by inhibiting use of only SYNC code used in communication with a called station, synchronization with only a called station using the SYNC code is inhibited (S501). Then, when the inhibit time T2 is over (S312), an instruction for releasing inhibition of the SYNC code is issued to the time-division processing circuit 105, and synchronization is enabled (S502).

As described, in Embodiment 3, in addition to the effects achieved in Embodiment 1, as synchronization with only a called station in communication is inhibited by rejecting only the SYNC code to the called station in communication up to the point of time, a calling station can be used without any trouble even if an event from another station occurs within the inhibit time T2.

The configuration in Embodiment 4 is similar to that in the Embodiment 1, 2 types of synchronization request code, first synchronization request code (described as SYNC code hereinafter) used for notification of a new event in a stand-by state where communication is not being executed in the time-division processing circuit 105 and second synchronization request code (described as SYNC* code hereinafter) used when it is necessary to establish synchronism again because of an error during communication, are selectively sent. As in embodiments 1 and 2, by inhibiting reception of SYNC code for the inhibit time T2 in synchronization inhibit control by the microcomputer control section 108, communication is terminated if synchronization can not be established within the reference time T1 in the communication terminating control. It should be noted that other portions in this embodiment are the same as those in Embodiment 1 and description is made for only different portions thereof.

Figure 6:
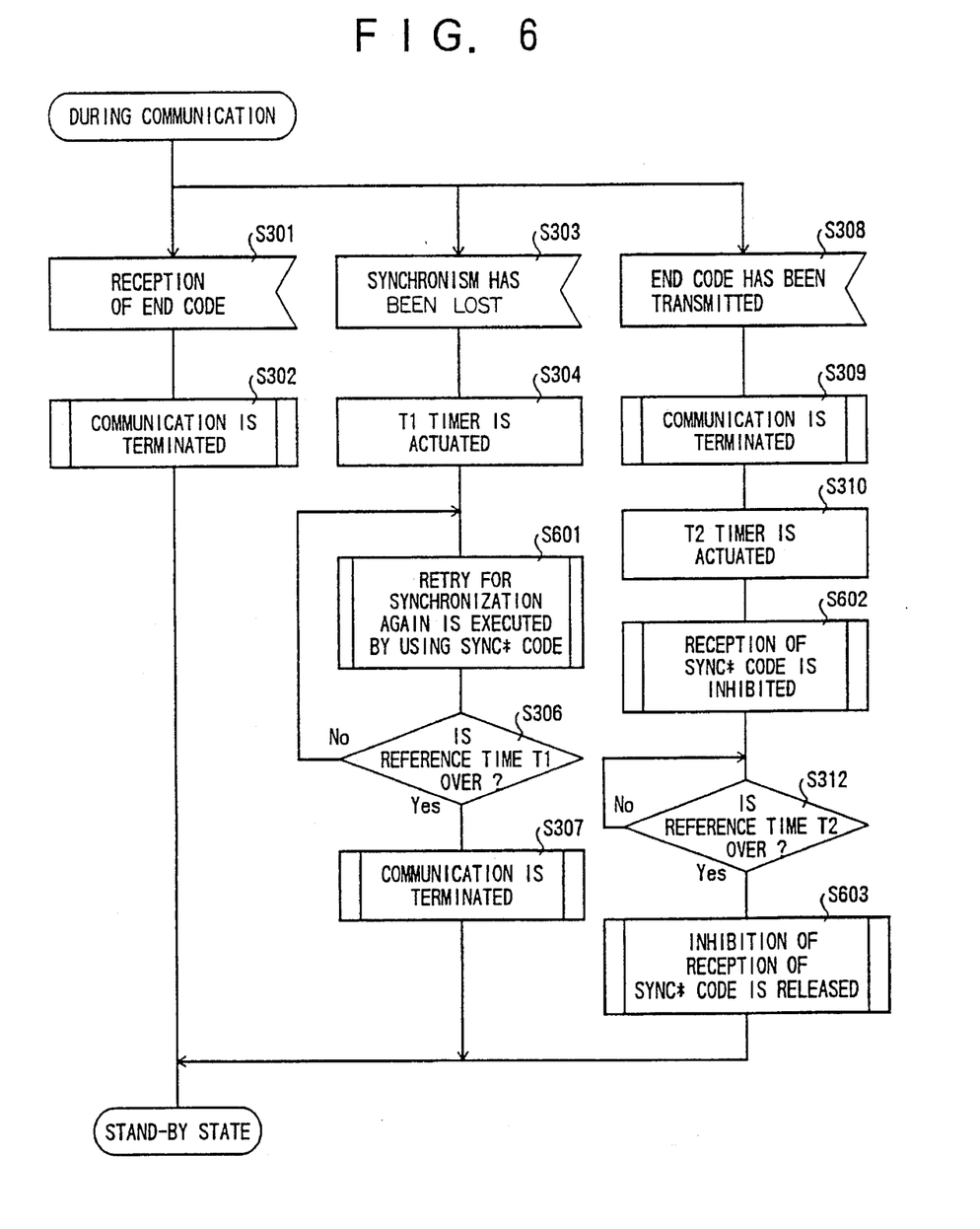
FIG. 6 is a flow chart of controlling operations of the microcomputer control section in Embodiment 4.

FIG. 6 is a flow chart of controlling operations by the microcomputer control section 108 in Embodiment 4, and the same reference numerals as those in the flow chart for controlling operations in Embodiment 1 shown in FIG. 3 indicate the same process respectively. In this figure, when information indicating that synchronism has not been established is inputted from the time-division processing control 105 (S303), communication end control is started with the T1 timer actuated (S304), an instruction for retry for synchronization is issued to the time-division processing circuit 105, and the time-division processing control 105 sends SYNC* code to a called station for retrying synchronization (S601). This retry for synchronization is repeated until the reference time T1 is over (S306), and communication is terminated when the reference time T1 is over (S307).

When information indicating that an END code was sent is inputted from the time-division processing circuit 105 (S308), synchronization inhibit control is started with communicating in a calling station terminated and the T2 timer actuated (S309, S310), and an instruction for rejection of SYNC* code is issued to the time-division processing circuit 105. In other words synchronization from a called station is inhibited by inhibiting retry for synchronization because of a reception error in the called station (S602). Then, when the inhibit time T2 is over (S312), an instruction for releasing inhibition of use of SYNC* code is issued to the time-division processing circuit 105, and synchronization is enabled (S603).

As described above, in Embodiment 4, only the SYNC code indicating a new event is accepted, so that connection to a called station is automatically inhibited for a certain period of time even if, for instance, an END code is not accepted by a called station, so that a calling station terminates communication and enters a stand-by state. For this reason, it is possible to terminate communication without fail when a call ends and also to reduce unnecessary transmission after end of a call.

The configuration in Embodiment 5 is similar to that in Embodiment 1, and in the microcomputer control section 108. When a SYNC code is received from a called station for the inhibit time T2 after transmission of an END code, synchronism is established and the END code is sent again to terminate communication. It should be noted that other portions of Embodiment 5 are the same as those in Embodiment 1, and description is made for only different points.

Figure 7:
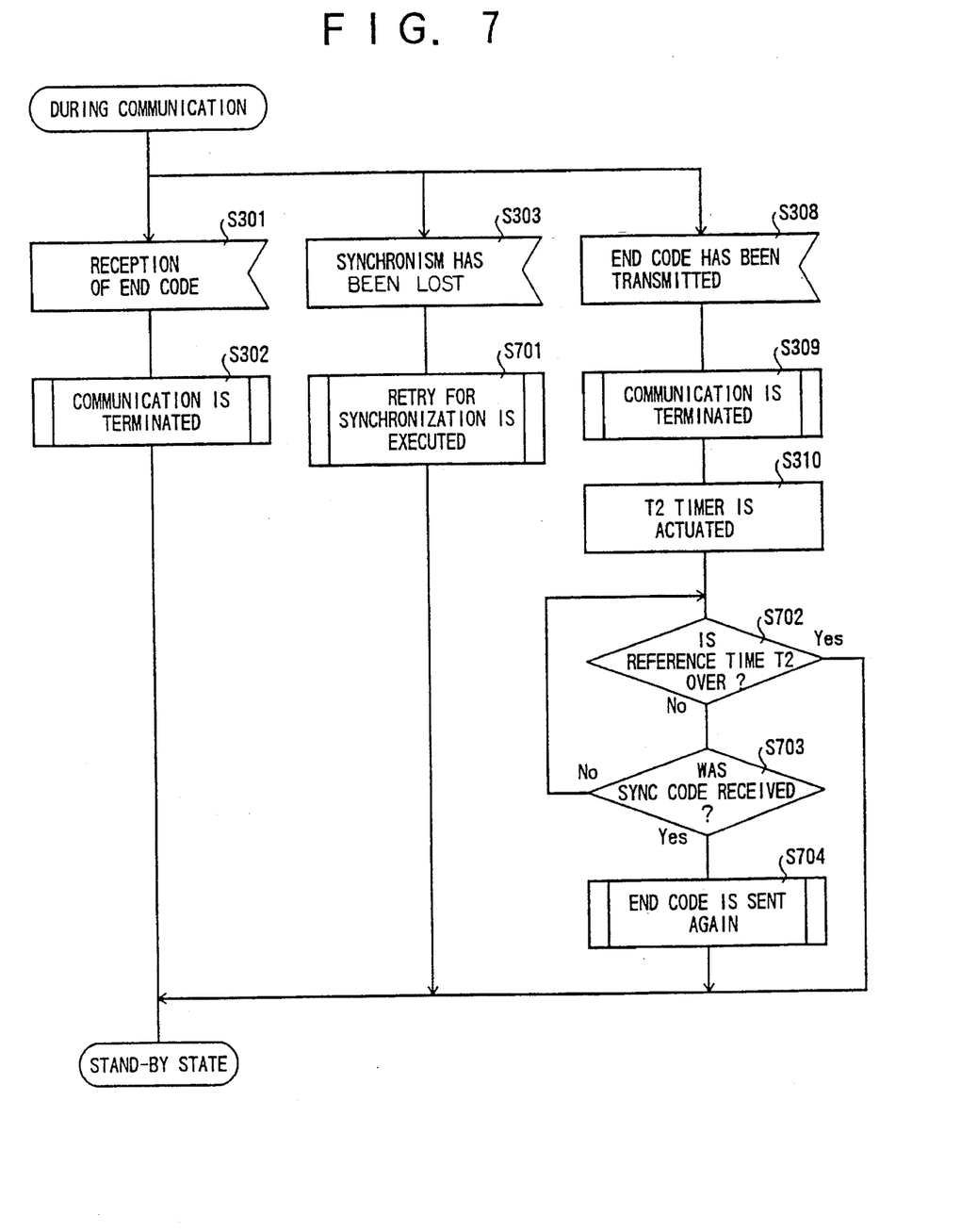
FIG. 7 is a flow chart of controlling operations of the microcomputer control section in Embodiment 5.

FIG. 7 is a flow chart of controlling operations by the microcomputer control section 108 in Embodiment 5, and the same reference numerals as those in the flow chart for controlling operations in Embodiment 1 shown in FIG. 3 indicate the same process respectively. In this figure, when information indicating that synchronism has not been established is inputted from the time-division processing circuit 105 (S303), an instruction for retry of synchronization is issued to the time-division processing circuit 105, and a SYNC code is sent for retry of synchronization (S701).

On the other hand, when information indicating that an END code was sent is inputted from the time-division processing circuit 105 (S308), synchronization inhibit control is started with communication in a calling station terminated and the T2 timer actuated (S309, S310), determination as to whether SYNC code from the called station was received within the inhibit time T2 by the time-division processing circuit 105 or not is executed (S702, S703), and if a SYNC code is received within the inhibit time T2, an END code is sent again (S704). When the inhibit time T2 is over, the processing is terminated.

As described above, in Embodiment 5, if a SYNC code is received within the inhibit time T2, an END code is sent again after synchronism is established and end of communication is notified, so that even if an END code is not received by a called station due to interference or for other reason and synchronism is not established, communication can be terminated without fail. Also even in this case, transactions of unnecessary electric waves after end of a call can be reduced as compared to a method in which confirmation of reception of an END code between a calling station and a called station is executed and then communication is terminated.

As described above, the cordless telephone system and communication method thereof according to the present invention comprises a synchronization inhibiting means for inhibiting synchronization with a called station in communication with the calling station for a prespecified inhibit time after transmission of communication end request code when the calling station sends communication end request code to terminate communication, and a communication terminating means for terminating communication when a state where synchronism with a called station is lost continues for a prespecified reference time during communication, so that communication can be terminated without fail when a call ends and transactions of unnecessary transmission after end of transmission can be reduced.

Also the cordless telephone system and communication method thereof, according to the present invention, comprises a synchronizing means for selectively sending two types of synchronization request code, that is, a first synchronization request code used for notification of a new event in a stand-by state where communication is not being executed, and a second synchronization request code used when it is necessary to establish synchronism again because of an error during communication, a synchronization inhibiting means for inhibiting reception of a second synchronization request code for a prespecified inhibit time after transmission of a communication end request code when a calling station sends a communication end request code to terminate communication, and a communication terminating means for terminating communication if a state where synchronism with a called station is lost continues for a prespecified reference time during communication. Hence, communication can be terminated without fail when a call ends and unnecessary transmission of waves after end of a call can be reduced.

The cordless telephone system and communication method thereof according to the present invention comprises a communication terminating means for establishing synchronism and then sending communication end request code again when a synchronization request code is received from a called station for a prespecified inhibit time after transmission of a communication end request code, so that communication can be terminated without fail when a call ends and unnecessary transmission of electric waves after the end of a call can be reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cordless telephone system executing communication between a first master phone and a first slave phone in a communication period of time according to a time division multiplexing operation, said cordless telephone system comprising:

circuitry in said first master phone for sending a first synchronization request code and a first communication end request code;

a synchronization inhibiting means for inhibiting said first master phone from establishing synchronization with said first slave phone, regardless of the presence of a second synchronization request code from said first slave phone, for a prespecified inhibit period of time after said circuitry in said first master phone sends the communication end request code, within the communication period; and a communication terminating means for terminating communication with said first slave phone in case that a synchronous state in the communication with said first slave phone has been lost for a prespecified period of time.

2. A cordless telephone system selectively executing communication between n (n: an integral number) units of master phone and m (m: an integral number) units of slave phone according to a time division multiplexing system, at least one of said master phone and said slave phone comprising:

a synchronization inhibiting means for inhibiting, when a calling station sends a communication end request code to terminate communication, synchronization with a called station for a prespecified inhibit time after transmission of said communication end request code; and a communication terminating means for terminating communication when a state where synchronism has been lost with the called station continues for a prespecified time.

3. A cordless telephone system according to claim 2, wherein said synchronization inhibiting means inhibits synchronization with the called station in communication therewith by stopping input or output of a signal to at least one of a transmitter, a receiver and/or a time-division processing circuit for said prespecified inhibit time.

4. A cordless telephone system according to claim 2, wherein said synchronization inhibiting means inhibits synchronization with said called station in communication therewith by inhibiting use of a frequency used in said communication for said prespecified inhibit time.

5. A cordless telephone system according to claim 2, wherein said synchronization inhibiting means inhibits synchronization with said called station in communication therewith by inhibiting use of a synchronization request code used in said communication during said prespecified inhibit time.

6. A cordless telephone system according to claim 5, wherein said synchronization inhibiting means inhibits synchronization with said called station in communication therewith by inhibiting reception of said synchronization request code.

7. A cordless telephone system selectively executing communication between n (n: integral number) units of master phone and m (m: integral number) units of slave phone according to a time division multiplexing system, at least one of said master phone and said slave phone comprising:

a synchronizing means for selectively sending two types of synchronization request codes, namely, a first synchronization request code used to notify a new event in a standby state where communication is not being executed and a second synchronization request code used when it is necessary to establish synchronism again because of an error during communication;

a synchronization inhibiting means for inhibiting, when a calling station sends a communication end request code to terminate communication, reception of the second synchronization request code for a prespecified inhibit time after transmission of said communication end request code; and a communication terminating means for terminating communication when a state where synchronism with a called station is lost continues for a prespecified time during communication.

8. A cordless telephone system comprising:

an executing means for selectively executing communication between n (n: integral number) units of master phone and m (m: integral number) units of slave phone according to a time division multiplexing system; and a communication terminating means for sending a second communication end request code when a synchronization request code is received from a called station during a prespecified inhibit time after transmission of a first communication end request code.

9. A communication method of a cordless telephone system comprising the steps of:

executing selectively communication between n (n: an integral number) units of master phone and m (m: an integral number) units of slave phone according to a time division multiplexing system;

inhibiting, when a calling station sends a communication end request code to terminate communication, synchronization with a called station for a prespecified inhibit time after transmission of the communication end request code; and terminating communication when a state where synchronism has been lost with the called station continues for a prespecified time.

10. A communication method of a cordless telephone system according to claim 9, wherein said inhibiting step inhibits synchronization with the called station in communication therewith by stopping input or output of a signal to at least one of a transmitter, a receiver and/or a time-division processing circuit for said prespecified inhibit time.

11. A communication method of a cordless telephone system according to claim 9, wherein said inhibiting step inhibits synchronization with said called station in communication therewith by inhibiting use of a frequency used in said communication for said prespecified inhibit time.

12. A communication method of a cordless telephone system according to claim 9, wherein said inhibiting step inhibits synchronization with said called station in communication therewith by rejecting a synchronization request code from the called station during said prespecified inhibit time.

13. A communication method of a cordless telephone system comprising the steps of:

executing selectively communication between n (n: integral number) units of master phone and m (m: integral number) units of slave phone according to a time division multiplexing system;

sending selectively two types of synchronization request codes, namely, a first synchronization request code used to notify a new event in a stand-by state where communication is not being executed and a second synchronization request code used when it is necessary to establish synchronism again because of an error during communication;

inhibiting, when a calling station sends a communication end request code to terminate communication, reception of the second synchronization request code for a prespecified inhibit time after transmission of a communication end request code; and terminating communication when a state where synchronism with a called station is lost continues for a prespecified time during communication.

14. A communication method of a cordless telephone system comprising the steps of:

executing selectively communication between n (n: integral number) units of master phone and m (m: integral number) units of slave phone according to a time division multiplexing system; and sending a second communication end request code when a synchronization request code is received from a called station during a prespecified inhibit time after transmission of a first communication end request code.

15. A communication system including at least first and second stations having transmitters and receivers to provide information exchange between the stations, and to transmit an end code indicating end of communication and a synchronization signal to reestablish connection between the stations if the connection is broken, wherein said first station comprises:
a first means for setting a first time period after sending the end code and;
a second means for preventing the communication from being established in response to the synchronization signal from the second station during said first time period, and said second station comprises
a third means for setting a second time period after sending the synchronization signal, and
a fourth means for preventing transmission of the synchronization signal after said second time period expires.

16. The system of claim 15, wherein said first time period is larger than said second time period.

17. The system of claim 15, wherein the synchronization signal is sent when the end code is not received by the second station.

18. A cordless telephone system selectively executing communication between a first phone and a second phone in a communication period of time according to a time division multiplexing operation, said first phone comprising:

a transmitter;

a receiver;

a time-division processing circuit executing said time division multiplexing operation; and a control section, connected to and controlling said transmitter, said receiver and said time-division processing circuit, said control section controlling said transmitter so as to cause said transmitter to send a first synchronization request code and a first communication end request and to inhibit said transmitter from establishing synchronization, in response to a second synchronization request code from said second phone, for a prespecified inhibit period of time after said transmitter sends the communication end request code, within the communication period, and controlling said receiver and said time-division processing circuit so as to cause said first phone to terminate communication with said second phone when a synchronous state in the communication with said second phone has been lost for a prespecified period of time.

19. A cordless telephone system according to claim 18, wherein said control section inhibits synchronization with the second phone by stopping input or output of a signal to at least one of said transmitter, said receiver and/or said time-division processing circuit for said prespecified inhibit time.

20. A cordless telephone system according to claim 18, wherein said control section inhibits synchronization with the second phone by inhibiting use of a frequency used by said transmitter in transmission of said communication for said prespecified inhibit time.

21. A cordless telephone system according to claim 18, wherein said control section inhibits synchronization with the second phone by inhibiting use of a synchronization request code used in said communication during said prespecified inhibit time.

22. A cordless telephone system according to claim 21, wherein said control section inhibits synchronization with said second phone in communication therewith by inhibiting reception of said synchronization request code.

* * * * *